(12) United States Patent
Huang et al.

(10) Patent No.: US 11,611,921 B2
(45) Date of Patent: Mar. 21, 2023

(54) BANDWIDTH PART SWITCHING WITHIN DIFFERENT SWITCHING DELAYS

(71) Applicant: MEDIATEK INC., Hsinchu (TW)

(72) Inventors: Din-Hwa Huang, Hsinchu (TW); Tsang-Wei Yu, Hsinchu (TW); Wei-De Wu, Hsinchu (TW)

(73) Assignee: MEDIATEK INC., Hsinchu (TW)

(*) Notice: Subject to any disclaimer, the term of this patent is extended or adjusted under 35 U.S.C. 154(b) by 0 days.

(21) Appl. No.: 16/864,661

(22) Filed: May 1, 2020

(65) Prior Publication Data
US 2020/0351738 A1    Nov. 5, 2020

Related U.S. Application Data

(60) Provisional application No. 62/888,022, filed on Aug. 16, 2019, provisional application No. 62/842,686, filed on May 3, 2019.

(51) Int. Cl.
*H04W 36/06* (2009.01)
*H04B 17/391* (2015.01)
(Continued)

(52) U.S. Cl.
CPC .......... *H04W 36/06* (2013.01); *H04B 17/364* (2015.01); *H04B 17/391* (2015.01); *H04W 36/26* (2013.01)

(58) Field of Classification Search
CPC ................ H04W 36/06; H04W 36/26; H04W 72/0453; H04B 17/391; H04B 17/364
See application file for complete search history.

(56) References Cited

U.S. PATENT DOCUMENTS

| 2019/0059112 A1 | 2/2019 | Ou et al. |
| 2019/0103953 A1 | 4/2019 | Liao et al. |

(Continued)

FOREIGN PATENT DOCUMENTS

| CN | 109413755 A | 3/2019 |
| WO | WO 2018/085145 A1 | 5/2018 |

(Continued)

OTHER PUBLICATIONS

Combined Taiwanese Office Action and Search Report dated Dec. 31, 2020 in corresponding Taiwanese Patent Application No. 109114816 (with English Translation of Category of Cited Documents), 6 pages.

(Continued)

*Primary Examiner* — Chae S Lee
(74) *Attorney, Agent, or Firm* — Oblon, McClelland, Maier & Neustadt, L.L.P.

(57) ABSTRACT

Aspects of the disclosure provide a method and an apparatus for performing a bandwidth part (BWP) switching process within different switching delays. For example, the apparatus can include receiving circuitry and processing circuitry. The receiving circuitry can receive from a BS a signaling indicating a change to a BWP configuration of the UE. The processing circuitry can perform a BWP configuration switching process based on the change to the BWP configuration to switch an active BWP configuration to a new BWP configuration, and monitor data transmission from the BS with the new BWP configuration either after a first predefined switching delay when the change to the BWP configuration includes at least one of a predefined set of BWP configuration parameters or after a second predefined switching delay when the change to the BWP configuration does not include any one of the predefined set of BWP configuration parameters.

20 Claims, 8 Drawing Sheets

(51) Int. Cl.
*H04B 17/364* (2015.01)
*H04W 36/26* (2009.01)

(56) References Cited

U.S. PATENT DOCUMENTS

| | | | |
|---|---|---|---|
| 2019/0132109 A1* | 5/2019 | Zhou | H04L 5/001 |
| 2020/0059345 A1 | 2/2020 | Pelletier et al. | |
| 2020/0100178 A1* | 3/2020 | Kim | H04W 52/028 |
| 2021/0203468 A1* | 7/2021 | Yi | H04W 76/27 |
| 2021/0243793 A1* | 8/2021 | Ang | H04W 72/042 |

FOREIGN PATENT DOCUMENTS

| | | |
|---|---|---|
| WO | WO 2018/203717 A1 | 11/2018 |
| WO | WO 2019/062867 A1 | 4/2019 |
| WO | WO-2020205943 A1 * 10/2020 ............ H04W 36/06 |

OTHER PUBLICATIONS

International Search Report and Written Opinion dated Jul. 29, 2020 in PCT/CN2020/088791 citing documents AA, AO-AR and AX-AZ therein, 9 pages.

Qualcomm Incorporated, "UE Adaptation to the Traffic and UE Power Consumption Characteristics", 3GPP TSG-RAN WG1 Meeting #94bis, R1-1811282, Oct. 12, 2018, pp. 1-17.

Qualcomm Incorporated, "Fast SCG and SCell Activation", 3GPP TSG-RAN WGl1#97, R1-1907306, May 2, 2019, pp. 1-11.

Mediatek Inc., "Interruption Requirements due to BWP Switching", 3GPP TSG-RAN WG4 Meeting #86bis, R4-1803686, Apr. 20, 2018, 5 pages.

\* cited by examiner

BANDWIDTH PART SWITCHING WITHIN DIFFERENT SWITCHING DELAYS

INCORPORATION BY REFERENCE

This present disclosure claims the benefit of U.S. Provisional Application No. 62/842,686, "Mechanism on UE dynamic adaptation of max MIMO layer and the corresponding switch delay" filed on May 3, 2019 and U.S. Provisional Application No. 62/888,022, "Mechanism on normal and fast BWP switching and the corresponding switch delay and interruption time" filed on Aug. 16, 2019, both of which are hereby incorporated herein by reference in their entirety.

TECHNICAL FIELD

The present disclosure relates to wireless communications, and, more particularly, to a method and an apparatus for performing a bandwidth part switching process within different switch delays.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

New radio (NR) cellular technology is designed to support various and new industrial use cases, such as enhanced mobile broadband (eMBB), ultra-reliable and low latency communication (URLCC), massive machine type communication (mMTC), and vehicle to everything communication (V2X). These use cases require highly challenging quality of service (QoS) metrics, such as peak data rate, latency, reliability, availability, and coverage bandwidth.

Inefficient energy consumption leads to poor user experience. NR radio access technology improves battery efficiency and achieves power savings through a variety of techniques, such as bandwidth part (BWP) switching, cross-slot scheduling, maximum layer switching, and secondary cell (SCell) dormancy technique.

SUMMARY

Aspects of the disclosure provide a method for performing a bandwidth part (BWP) process within different switching delays. The method can include receiving at a user equipment (UE) from a base station (BS) a signaling indicating a change to a BWP configuration of the UE, and performing a BWP configuration switching process based on the change to the BWP configuration to switch an active BWP configuration to a new BWP configuration. The method can further include monitoring data transmission from the BS with the new BWP configuration either after a first predefined switching delay when the change to the BWP configuration includes at least one of a predefined set of BWP configuration parameters or after a second predefined switching delay when the change to the BWP configuration does not include any one of the predefined set of BWP configuration parameters.

According to some embodiments of the disclosure, the method can further include receiving the predefined set of BWP configuration parameters from the BS. According to some other embodiments of the disclosure, the method can further include receiving a set of BWP configurations, determining whether the UE monitors data transmission after the first predefined switching delay or after the second predefined switching delay corresponding to different changes between any two of the set of BWP configurations corresponding to different changes between any two of the set of BWP configurations, and transmitting the determined switching delays corresponding to the different changes to the BS. According to various embodiments of the disclosure, the method can further include transmitting to the BS an indication as to whether the UE monitors data transmission after the second predefined switching delay when the change to the BWP configuration does not include any one of the predefined set of BWP configuration parameters.

For example, the signaling is a downlink control information (DCI). For another embodiment, the signaling triggers a timer of the UE. Besides, the second predefined switching delay can be shorter than a radio resource control (RRC)-based BWP switching delay. Further, the second predefined switching delay is not longer than the first predefined switching delay. In some embodiments, the BWP configuration switching process is a maximum layer switching process, a cross-slot scheduling process or a dormant-non-dormant cell switching process, and monitoring data transmission from the BS with the new BWP configuration includes monitoring data transmission from the BS with the new BWP configuration after the second predefined switching delay. Additionally, the BWP configuration switching process includes a radio frequency (RF) tuning procedure when the change to the BWP configuration includes at least one of the predefined set of BWP configuration parameters Aspects of the disclosure also provide an apparatus, which can include receiving circuitry and processing circuitry. The receiving circuitry can be configured for receiving from a BS a signaling indicating a change to a BWP configuration of the UE. The processing circuitry can be configured for performing a BWP configuration switching process based on the change to the BWP configuration to switch an active BWP configuration to a new BWP configuration, and monitoring data transmission from the BS with the new BWP configuration either after a first predefined switching delay when the change to the BWP configuration includes at least one of the predefined set of BWP configuration parameters or after a second predefined switching delay when the change to the BWP configuration does not include any one of the predefined set of BWP configuration parameters.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

A user equipment (UE) can be switched to and operate on different bandwidth parts (BWPs) that have different central frequencies, bandwidth sizes, and/or numerologies. A BWP switching between two different BWP configurations can take a great amount of time if a change to the different BWP configurations includes some specific parameters, such as locationAndBandwidth and nrofSRS-Ports, or can be performed very fast. However, the UE has to wait a constant switching delay to start to monitor data transmission from a base station (BS) in either of the above two scenarios. Aspects of the disclosure provide a method and an apparatus, which, after preforming the BWP switching, can monitor the data transmission after a first switching delay when the change to the BWP configuration includes at least one of the specific parameters, or after a second switching delay that is shorter than the first switching delay when the change to the BWP configuration does not include any one of the specific parameters.

Figure 1:
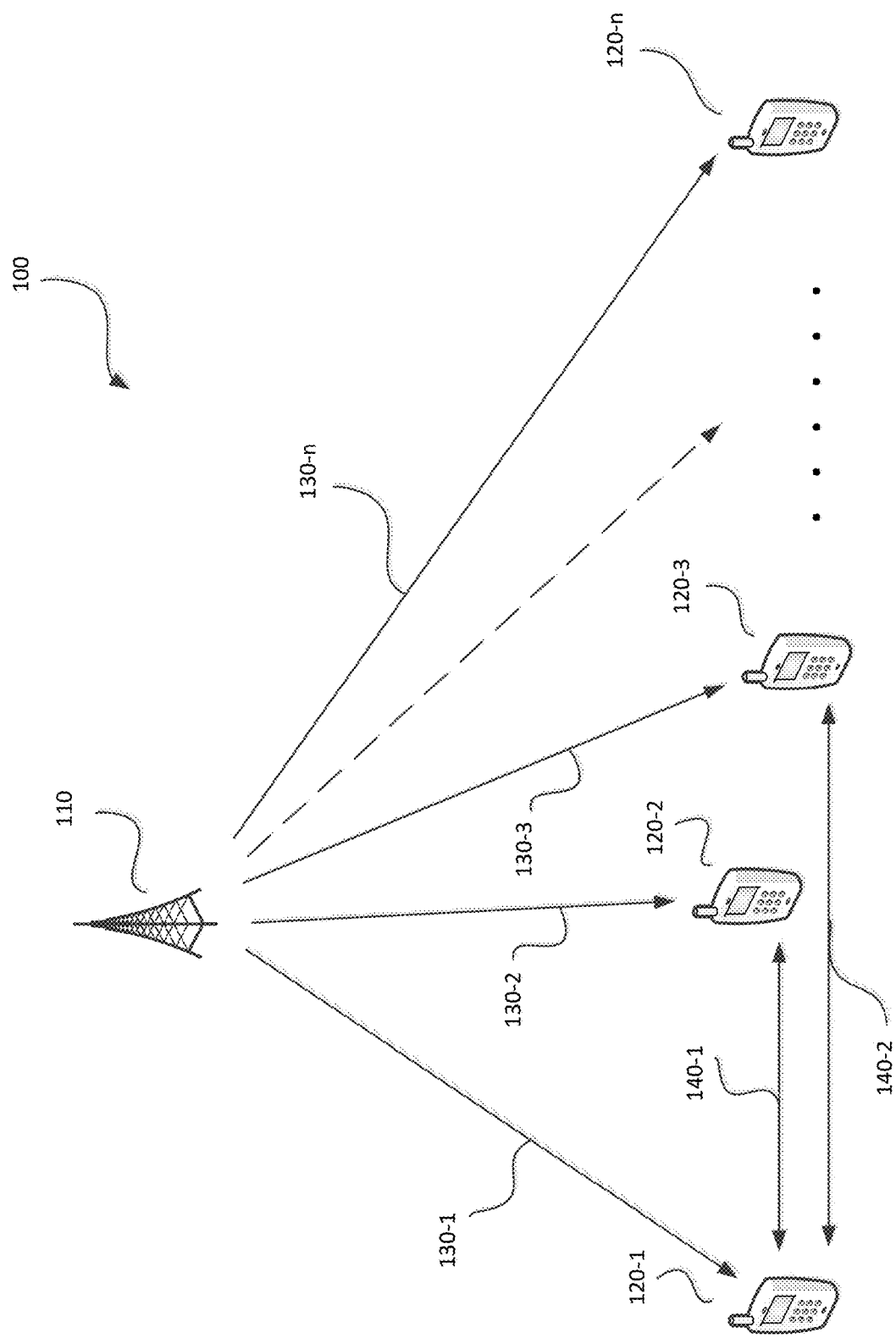
FIG. 1 shows a diagram of an exemplary wireless communication system according to some embodiments of the disclosure.

FIG. 1 shows a diagram of an exemplary wireless communication system 100 according to some embodiments of the disclosure. In some embodiments, the wireless communication system 100 can be a long term evolution (LTE) network, an LTE-advanced (LTE-A) network, or an NR network. As shown, the wireless communication system 100 can include a base station 110 and multiple user equipments (UEs) 120-1 to 120-n. The BS 110 and the UEs 120 can wirelessly communicate with each other via radio interfaces (referred to as Uu interfaces, e.g., uplink radio interfaces) 130-1 to 130-n, respectively, and the UEs 120 can also wirelessly communicate with each other via radio interfaces (referred to as PC5 interfaces, e.g., sidelink radio interfaces) 140-1 and 140-2. In some embodiments, the BS 110 can be a NodeB (NB), an eNodeB (eNB), or a next-generation NodeB (gNB). In some other embodiments, the UEs 120 can be any device that is capable of wirelessly communicating with the BS 110 via the uplink radio interfaces 130, as well as communicating with the UEs 120 via the sidelink radio interfaces 140. For example, the UEs 120 can be a vehicle, a computer, a mobile phone, and the like.

LTE is designed under the assumption that all devices (e.g., the UE 120) are capable of the maximum carrier bandwidth of 20 MHz. The same assumption is not reasonable for NR, given the very wide carrier bandwidth supported. Consequently, means for handling different device capabilities in terms of bandwidth support must be included in the NR design. Furthermore, reception of a very wide bandwidth can be costly in terms of device power consumption compared to receiving a narrower bandwidth. It is better that in NR a device can employ a narrower bandwidth to monitor control channel and to receive data transmission of small to medium size, and adapt to a wider bandwidth when a large amount of data is scheduled. NR defines bandwidth parts (BWPs) to handle the above two aspects.

A BWP is a contiguous set of physical resource blocks (PRBs), selected from a contiguous subset of the common resource blocks for a given numerology in bandwidth part on a given carrier. The UE 120 can be configured with up to four DL BWPs in the downlink with a single DL BWP being active at a given time. Also, the UE 120 can be configured with up to four UL BWPs in the uplink with a single UL BWP being active at a given time. If the UE 120 is configured with a supplementary uplink, the UE 120 can in addition be configured with up to four supplementary UL BWPs in the supplementary uplink with a single supplementary UL BWP being active at a given time. The four DL/UL BWPs consist of initial, active and UE-specific DL/UL BWPs. The UE 120 is not expected to receive PDSCH, PDCCH or CSI-RS (except for radio resource management (RRM)) outside the active DL BWP. Similarly, the UE 120 shall not transmit PUSCH or PUCCH outside the active UL BWP.

Figure 2:
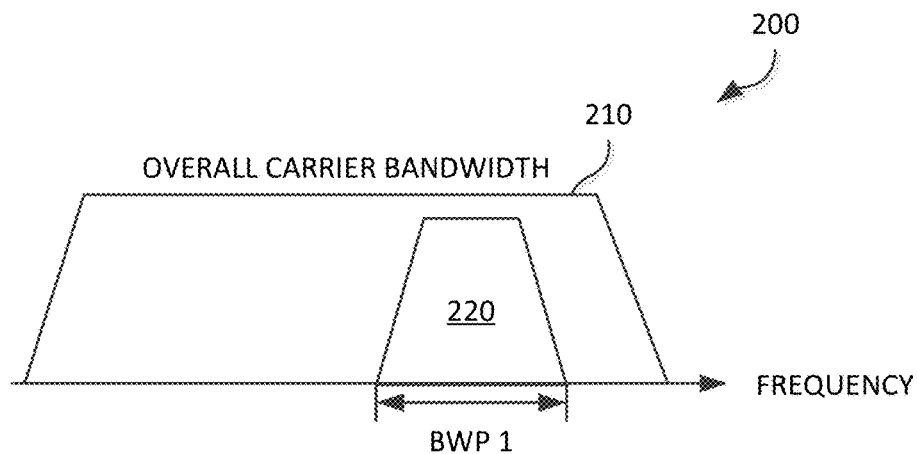
FIGS. 2-4 show three different exemplary BWP allocation scenarios according to some embodiments of the disclosure.
Figure 3:
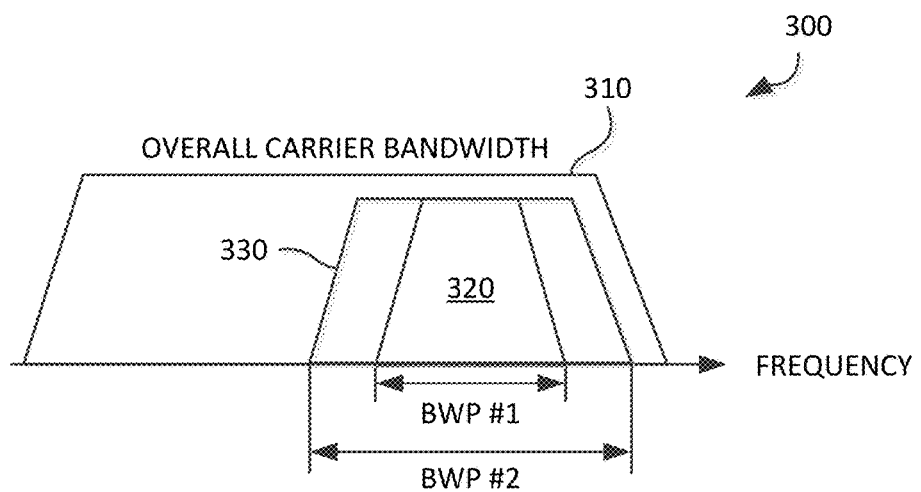
Figure 4:
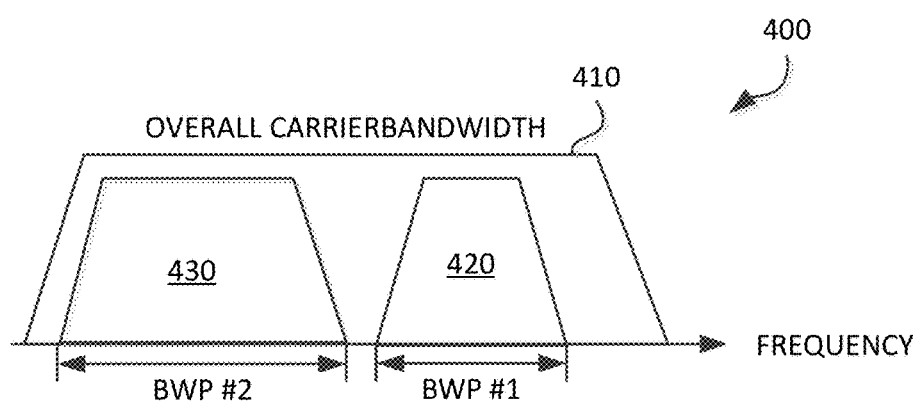

FIGS. 2-4 show three different exemplary BWP allocation scenarios 200, 300, and 400 according to some embodiments of the disclosure. As shown in FIG. 2, the BWP allocation scenario 200 can support reduced UE bandwidth capability (e.g., BWP #1 220) that is especially helpful for UEs with limited RF capability or not capable of full carrier bandwidth (e.g., an overall carrier bandwidth 210). As shown in FIG. 3, the BWP allocation scenario 300 can support reduced UE power consumption for intermittent and bursty traffic profile. For example, the UE 120 can operate on BWP #1 320 in an overall carrier bandwidth 310 for intermittent traffic profile, and be switched to operate on BWP #2 330 for receiving bursty data. In the BWP allocation scenario 300, BWP #1 320 and BWP #2 330 have the same central frequency and subcarrier spacing (SCS) but different bandwidths. As shown in FIG. 4, the BWP allocation scenario 400 can support two non-contiguous BWPs with different numerologies allowing different services multiplexing. In the BWP allocation scenario 400, BWP #1 420 and BWP #2 430 in an overall carrier bandwidth 410 have different central frequencies, bandwidths and SCSs.

Each BWP is defined by the following configuration parameters: numerology, including cyclic prefix (CP) length, SCS and symbol duration; frequency location, including an offset between the BWP and a reference point; bandwidth size in terms of physical resource blocks (PRBs); and control resource set (CORESET).

According to the $3^{rd}$ generation partnership project (3GPP) TS 38.321, BWP selection and switching can be done with the following mechanisms. RRC-based adaptation (e.g., using a dedicated RRC signaling) is suitable for semi-static cases since the processing of RRC messages requires extra time, letting the latency reach as long as 10 msec. MAC control element (CE) adaptation is used upon initiation of a random access procedure. DCI-based adaptation (e.g., using a PDCCH downlink control information (DCI)) is based on PDCCH channel where a specific BWP can be activated by BWP indicator in DCI format 0_1 (UL grant) and DCI format 1_1 (DL scheduling). DCI-based adaptation, though having latency as low as 2 msec, requires additional considerations for error case handling, as the UE 120 may fail to decode the DCI having the BWP activation/deactivation command. To help to recover from such a DCI lost scenario, timer-based implicit fallback to default BWP (e.g., a bwp-inactivity timer) is designed to mitigate possible DCI errors. After the UE 120 receives the DCI-based BWP switching command, the timer starts to run. If the UE 120 is not explicitly scheduled with a BWP after the timer expires, it will automatically switch its active DL BWP to a default BWP.

There is an initial BWP for the UE 120 during the initial access until the UE 120P is explicitly configured with BWPs during or after RRC connection establishment. For a serving cell of the BS 110, the UE 120 can be provided by default-Downlink BWP Id a default DL BWP between the configured DL BWPs. If the UE 120 is not provided a default DL BWP by defaultDownlink BWP Id, the default DL BWP is the initial DL BWP.

Figure 5:
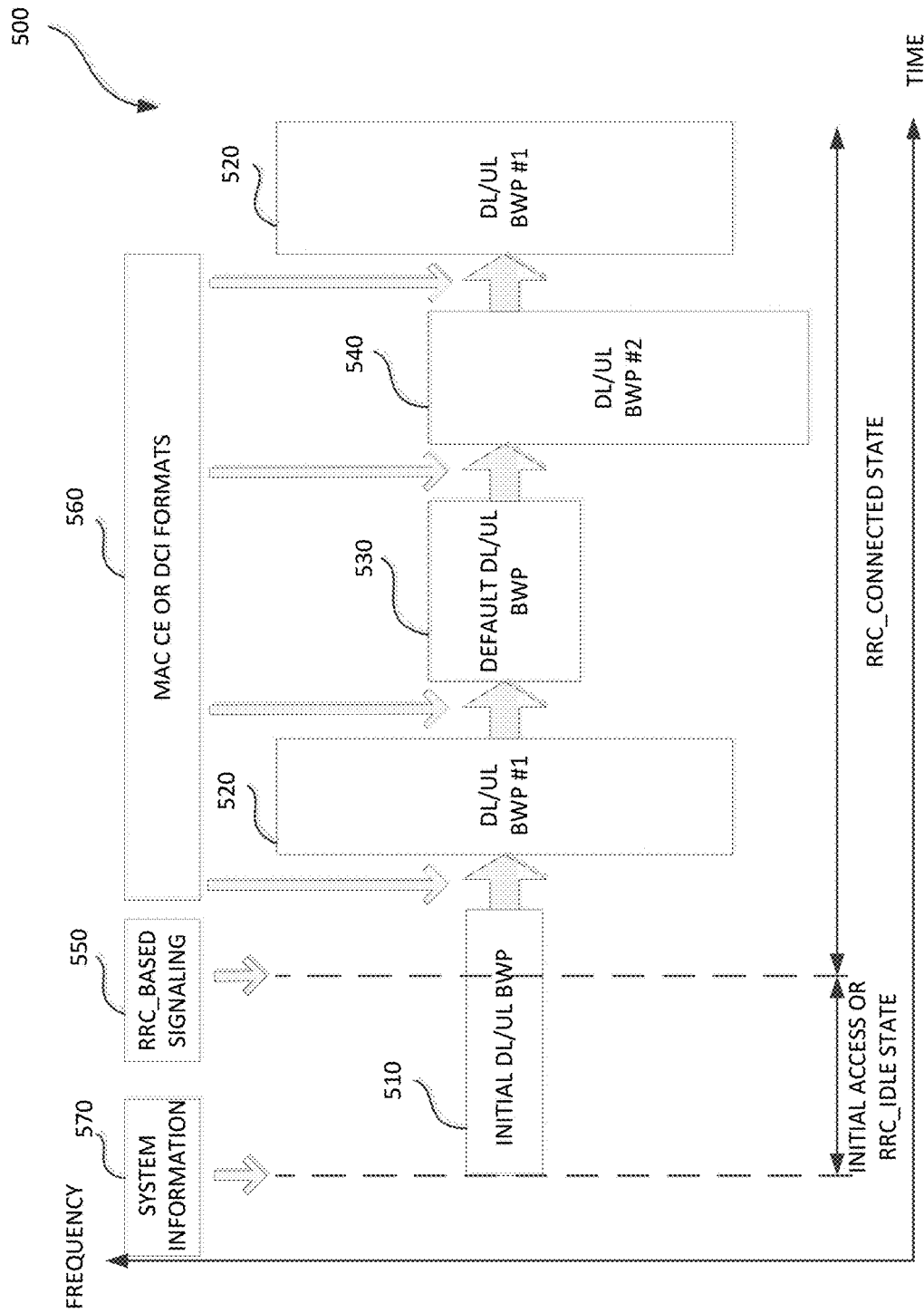
FIG. 5 shows an exemplary DL/UL BWP switching according to some embodiments of the disclosure.

FIG. 5 shows an exemplary DL/UL BWP switching 500 according to some embodiments of the disclosure. As shown, initial DL/UL BWP 510, DL/UL BWP #1 520 and default DL/UL BWP 530 have the same central frequency, but are different from DL/UL BWP #2 540 in terms of central frequencies and bandwidths. The UE 120 in a radio resource control idle (RRC idle) state can perform a random access procedure based on system information 570, and enter an RRC connected state. Then the UE 120 can be configured initial DL/UL BWP 510, DL/UL BWP #1 520, default DL/UL BWP 530 and DL/UL BWP #2 540 by RRC-based signaling 550 from higher layers that may include a variety of parameters, such as PRB-index-DL-common, initialDownlinkBWP, BWP-DownlinkDedicated, firstActiveDownlinkBWP-Id, locationAndBandwidth and bwp-InactivityTimer, and use initial DL/UL BWP 510 as an active DL/UL BWP to receive and transmit data. In some embodiments, a BWP switching process can be performed by MAC CE or DCI formats 560 to switch initial DL/UL BWP 510 to one of DL/UL BWP #1 520, default DL/UL BWP 530 and DL/UL BWP #2 540 as an active DL/UL BWP. For example, a bandwidth part indicator field in DCI format 1_1, if configured, can indicate the active DL BWP. For another example, a bandwidth part indicator field in DCI format 0_1, if configured, can indicate the active UL BWP. If a bandwidth part indicator field is configured in DCI format 0_1 or DCI format 1_1 560 and indicates an UL BWP or a DL BWP different from the active UL BWP or DL BWP, respectively, the UE 120 shall set the active UL BWP or DL BWP to the UL BWP or DL BWP indicated by the bandwidth part indicator in the DCI format 0_1 or DCI format 1_1, respectively.

Figure 6:
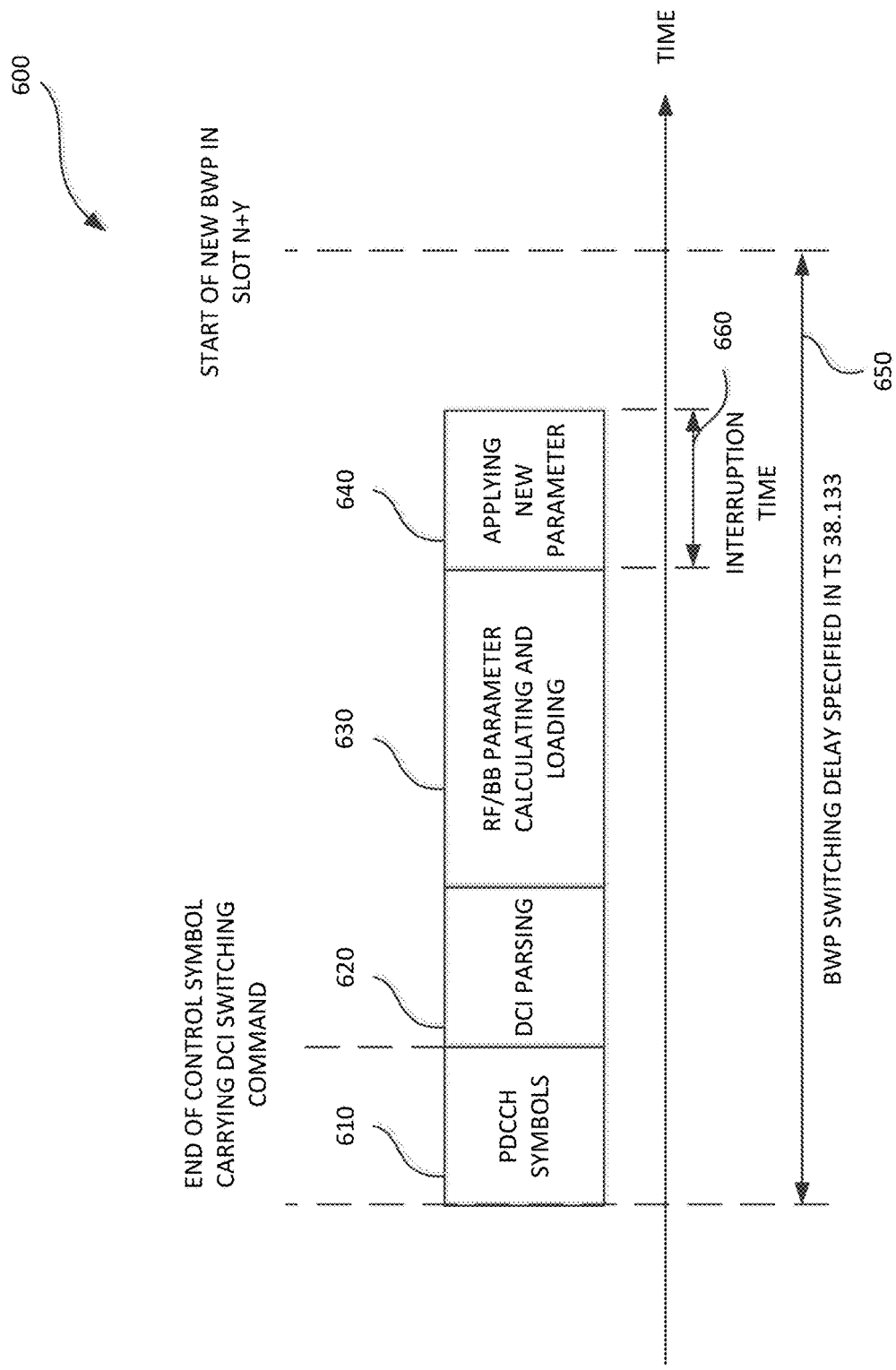
FIG. 6 is a timing diagram showing an exemplary DCI-based BWP switching process according to some embodiments of the disclosure.

FIG. 6 is a timing diagram showing an exemplary DCI-based BWP switching process 600 according to some embodiments of the disclosure. In a first operation 610, the UE 120 can receive a DCI (e.g., a DCI switching command) from the BS 110. The DCI switching command can include a BWP indicator for BWP switching. In a second operation 620, the UE 120 can detect and decode the DCI switching command. In a third operation 630, the UE 120 can be ready for radio frequency/baseband (RF/BB) parameter calculating and loading. For example, the UE 120 can recalculate RF/BB configuration (e.g., spur estimation, synthesizers reprogramming estimation, and low-IF calculation). In a fourth operation 640, the UE 120 can apply the new parameters obtained in the third operation 630. For example, the UE 120 can tune one or more transceivers to a new central frequency and new bandwidth associated with the BWP indicated by the DCI switching command. Tuning the transceivers (hereinafter referred to as "RF tuning") may include resetting PLL and reprogramming synthesizers with optimized values for new channel and channel combination due to the BWP switching, which take a great amount of time. Additionally, the UE 120 can tune the BB by changing the SCS associated the active BWP to the SCS associated with the BWP indicated by the DCI switching command.

A BWP switching delay 650 can at least span from the beginning of the first operation 610 (i.e., upon the reception of the DCI switching command) till the end of the fourth operation 640, at which the applying new parameter is complete. From RAN1 perspective, the BWP switching delay 650 can be the time duration from the end of last OFDM symbol of the PDCCH carrying the active BWP switching DCI (i.e., the DCI switching command) till the beginning of a slot indicated by K0 in the active DL BWP switching DCI or K2 in the active UL BWP switching DCI. The UE 120 cannot monitor data transmission from the BS 110 until the BWP switching delay 650 passes. In some embodiments, applying new parameters may cause interruption of one or more slots to other active serving cells in the same frequency range where the UE 120 is performing the BWP switching process 600. In this regard, an interruption time 660 can be as long as the time used for RF/BB parameter calculating and loading. In some embodiments, the interruption time 660 can be allowed to start only within the BWP switching delay 650.

From RAN4 perspective, RF tuning time can be different for intra-band scenario and inter-band scenarios. For example, for the intra-band scenario, RF tuning time can be up to 20 μsec if the central frequency is the same before and after the BWP switching (e.g., the BWP allocation scenario 300 of FIG. 3), or can be up to 50-200 μsec if the central frequency is different before and after the BWP switching; and for the intra-band scenario, RF tuning time can be up to 900 μsec.

It can be known from the above that when an active BWP is switched to a new BWP and a change to their BWP configuration parameters includes a central frequency, cyclic prefix (e.g., cyclicPrefix), and/or SCS (e.g., subcarrierSpacing), the UE 120 has to perform the RF tuning and the RF tuning can take up to 200 to 900 μsec. When the change to their BWP configuration parameters includes a bandwidth size only, the RF tuning, though still having to be performed, can take as short as 20 μsec. In such a case, the UE 120 can be ready to monitor the data transmission from the BS 110 before the entire BWP switching delay 650 has passed. In some cases where the changes to BWP configuration parameters of the active BWP and the new BWP do not include any one of the central frequency, bandwidth size and SCS and thus no RF tuning is required to be performed, the UE 120 can monitor the data transmission from the BS 110 even earlier.

In some embodiment, the BS 110 and the UE 120 can be equipped with multiple antennas, and employ transmit diversity, receive diversity, spatial multiplexing (e.g., multiple-input multiple-output (MIMO) communication) or beamforming techniques to reduce the amount of fading and increase the data rate, the received signal power and the coverage of the cell. In the MIMO communication, the number of antennas utilized by the UE 120 to receive data transmission from the BS 110 can vary over time, and the data transmission from the BS can include various numbers of MIMO layers. In NR, a network can support up to 8 MIMO layers, for single user MIMO (SU-MIMO). During RRC configuration, a maximum number of MIMO layers to be supported may be determined based on a number of codewords supported by the UE 120. For example, the number of codewords may be indicated by a parameter referred to as maxNorfCodeWordsScheduledByDCI. If maxNorfCodeWordsScheduledByDCI=1 (or 2), the network can send up to 4 (or 8) MIMO layers during a transmission time interval (TTI) for which the parameter is applicable.

For the UE 120 in RRC-connected state, the actual (as opposed to the maximum) number of MIMO layers can be dynamically indicated and adjusted by DCI based on various factors, e.g., channel conditions. For example, the number of MIMO layers can be reduced from 4 to 2, to save the power consumption of the UE 120. A BWP configuration can include a configured maximum number of MIMO layers to be supported by the BWP. A change (e.g., from 4 to 2) to the maximum number of MIMO layers of the BWP configuration does not trigger the time-consuming RF tuning procedure. Accordingly, the UE 120 can be ready to use the adjusted 2 MIMO layers to monitor data transmission from the BS 110 before the BWP switching delay 650 has passed.

According to some embodiments, the wireless communication system 100 can employ carrier aggregation (CA) technique to transmit or receive information over multiple component carriers (CCs) within a system bandwidth or a wideband CC to increase throughput. With respect to the frequency location of the different CCs, three different CA cases can be identified: intraband aggregation with frequency-contiguous component carriers, intraband aggregation with noncontiguous component carriers, and interband with noncontiguous component carriers. Each CC can be individually scheduled a scheduling assignment/grant transmitted on either the same CC as the data (self-scheduling) or on a different CC than the data (cross-carrier scheduling). In an exemplary cross-carrier scheduling scenario, the BS 110 can transmit a downlink grant included in a PDCCH to the UE 120 on a first CC (i.e., a scheduling CC, e.g., a BWP), and the downlink grant can indicate the available PDSCH on a second CC (i.e., a scheduled CC, e.g., another BWP).

In some embodiments, the UE 120 can start to buffer an entire bandwidth of an active DL BWP for potential data scheduling by the BS 110 at the starting of PDCCH monitoring (e.g., a search space occasion), as data can be scheduled by a DCI via PDCCH monitoring as early as the starting of PDCCH monitoring. When the UE 120 is not fully active, it is highly possible that no data is scheduled at the search space occasion yet. This leads to unnecessary data buffering as there is no data scheduled to the UE 120. To avoid such buffering, a cross-slot scheduling technique can be employed to ensure a minimum gap (or minimum scheduling delay) between a control channel and corresponding data. Accordingly, the UE 120 is not required to buffer data during the minimum gap. The minimum scheduling delay can define a minimum number of slots between a slot carrying the PDCCH that schedules a downlink data transmission and another slot carrying the scheduled downlink data transmission. The UE 120 can thus receive the downlink data transmission in a slot subsequent to the slot in which the UE 120 has decoded the PDCCH successfully. The BS 110 can transmit a configuration message indicating the minimum scheduling delay to the UE 120. In some embodiment, the UE 120 can identify the slot delay by receiving a BWP configuration having a slot delay parameter (e.g., K0), which is equal to a certain number of slots. The BWP configuration can also include K1 and K2. A change to K0, K1 and K2 of the BWP configuration also does not trigger the RF tuning procedure.

A significant portion of baseband power consumption is used for monitoring control channels, such as PDCCH. In some embodiments, the BS 110 can employ a secondary cell (SCell) dormancy technique to dynamically enable or disable PDCCH monitoring on an SCell. The BS 110 can transition the SCell to a dormant state when it has little traffic and can transition the SCell back to a non-dormant state when it has a higher traffic load. The UE 120 does not monitor any PDCCH in a dormant SCell. The UE 120, when receiving an indication to transition a SCell to a dormant state, can switch to a dormant bandwidth part of the SCell. The UE 120 can then switch to a non-dormant BWP when it receives another indication to transition the SCell to a non-dormant state. The BS 110 can configure a dormant BWP and a non-dormant BWP from downlink BWPs of the SCell. A change to the BWP configuration to transition a dormant BWP and a non-dormant BWP, and vice versa, also does not trigger the RF tuning procedure.

Although 3GPP TS 38.133 sets the BWP switching delay 650, the UE 120 can be ready to monitor data transmission from the BS 110 before the entire BWP switching delay 650 passes in some cases where a change to the BWP configuration in a BWP switching process does not include some specific parameters, such as a central frequency, CP length and SCS.

Figure 7:
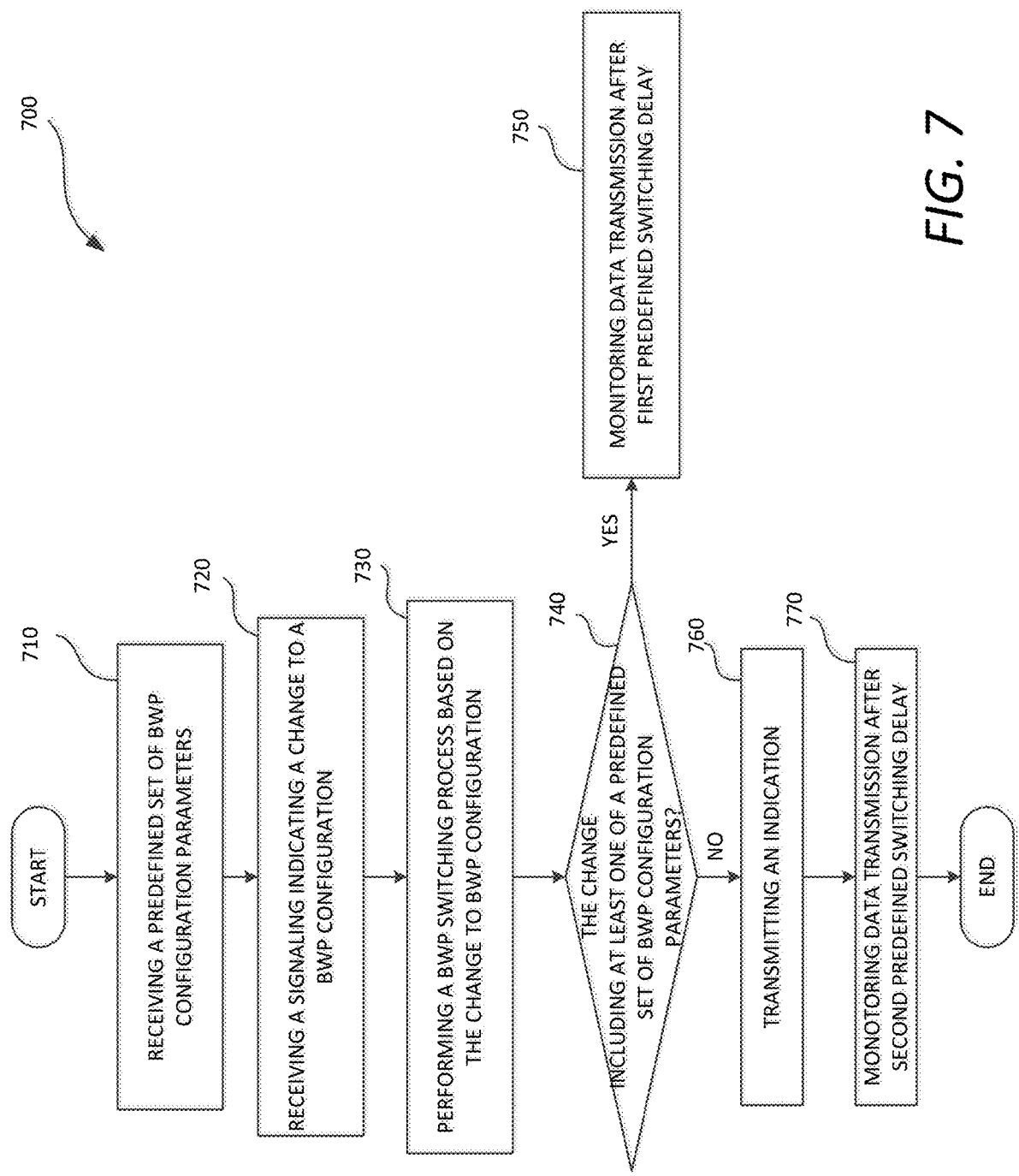
FIG. 7 is a flow chart of an exemplary method for performing a BWP switching process within different BWP switching delays according to some embodiments of the disclosure.

FIG. 7 is a flow chart of an exemplary method 700 for performing a BWP switching process within different BWP switching delays according to some embodiments of the disclosure. In some embodiments of the method 700, the UE 120 can monitor the data transmission from the BS 110 after the BWP switching delay 650 when a change to a BWP configuration includes at least one of a predefined set of BWP configuration parameters, such as a central frequency, CP length and SCS. In some other embodiments of the method 700, the UE 120 can start to monitor the data transmission from the BS 110 after a shorter BWP switching delay as long as the change to the BWP configuration does not include any one of the predefined set of BWP configuration parameters. In various embodiments, some of the steps of the method 700 shown can be performed concurrently, in a different order than shown, can be substituted for by other method step, or can be omitted. Additional method steps can also be performed as desired. Aspects of the method 700 can be implemented by a wireless device, such as the UE 120 illustrated in and describe with respect to the preceding figures.

At step S710, the UE 120 can receive from the BS 110 a predefined set of BWP configuration parameters. For example, the predefined set of BWP configuration parameters can include a central frequency, CP length and SCS. For another example, the predefined set of BWP configuration parameters can include other parameters, which, when changed, will trigger some other time consuming procedures.

At step S720, the UE 120 can receive from the BS 110 a signaling indicating a change to a BWP configuration of the UE 120. In some embodiment, the signaling can be a DCI. In some other embodiments, the signaling can trigger a timer of the UE 120.

At step S730, the UE 120 can perform a BWP configuration switching process based on the change to the BWP configuration to switch an active BWP configuration to a new BWP configuration.

At step S740, the UE 120 can determine whether the change to the BWP configuration includes at least one of a predefined set of BWP configuration parameters. For example, when the change to the BWP configuration includes at least one of the predefined set of BWP configuration parameters, the method 700 can proceed to step S750; otherwise, the method 700 can proceed to step S760.

At step S750, the UE 120 can monitor data transmission from the BS 110 with the new BWP configuration after a first predefined switching delay (e.g., the BWP switching delay 650), as the UE 120 may have to perform the time-consuming RF tuning procedure. In some embodiments, the first predefined switching delay is an RRC-based BWP switching delay.

At step S760, the UE 120 can transmit to the BS 110 an indication that the UE 120 can monitor data transmission after a second predefined switching delay. Accordingly, the BS 110 can transmit data transmission to the UE 120 after the second predefined switching delay.

At step S770, the UE 120 can monitor data transmission from the BS 110 with the new BWP configuration after the second predefined switching delay, which is shorter than the BWP switching delay 650. In some embodiments, the second predefined switching delay is not longer than the first predefined switching delay. For example, when the change to the BWP configuration includes a maximum number of MIMO layers, K0, K1 and K2 of the slot of a cross-carrier scheduling or a dormant-non-dormant indication, none of which is included in the predefined set of BWP configuration parameters, the UE 120 can perform a maximum layer switching process, a cross-slot scheduling process or a dormant-non-dormant cell switching process, respectively, none of which will trigger the time-consuming RF tuning procedure. In some embodiment, the second predefined switching delay is shorter than the RRC-based BWP switching delay.

Figure 8:
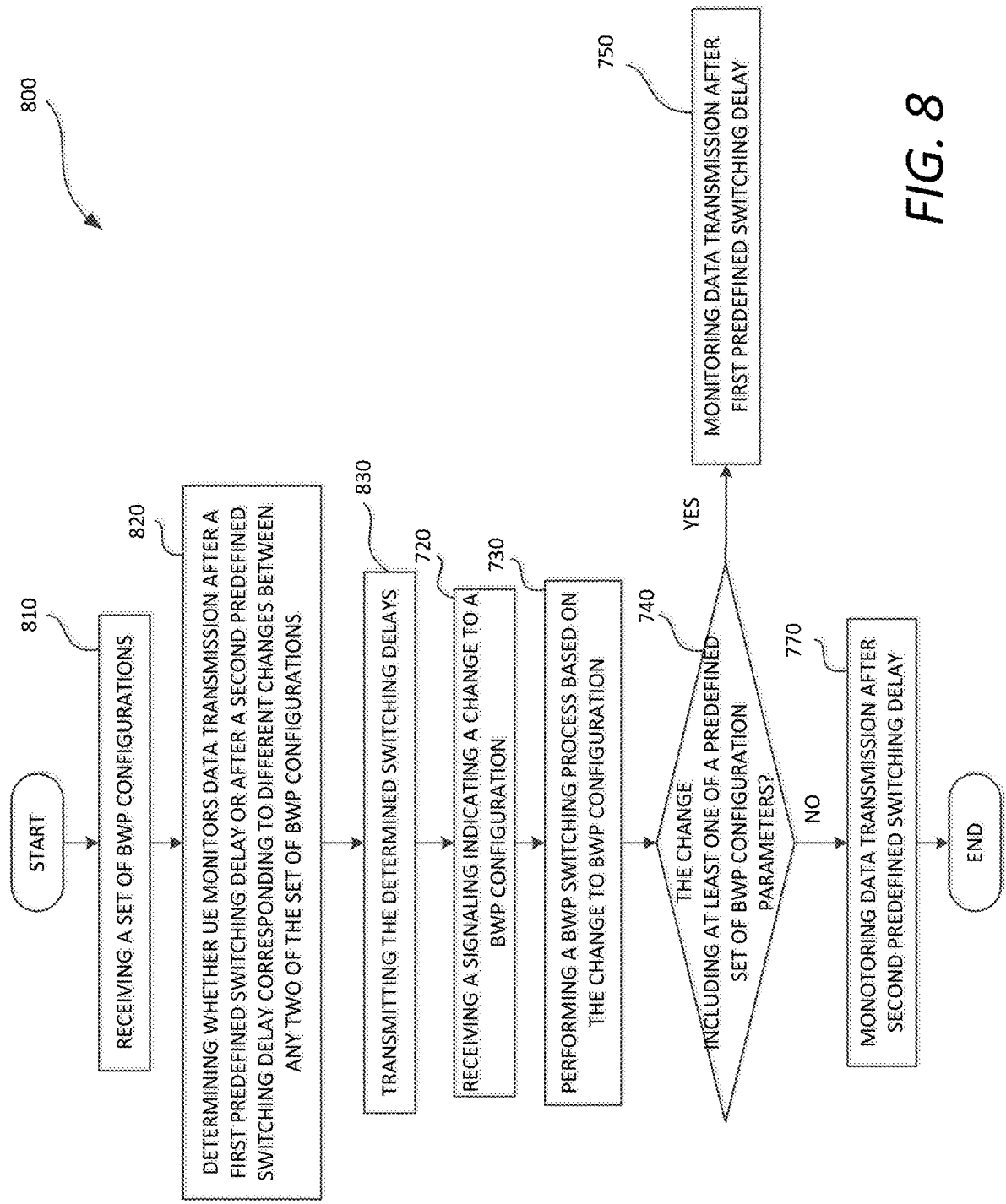
FIG. 8 is a flow chart of another exemplary method for performing a BWP switching process within different BWP switching delays according to some embodiments of the disclosure.

FIG. 8 is a flow chart of another exemplary method 800 for performing a BWP switching process within different BWP switching delays according to some embodiments of the disclosure. The method 800 can include steps S810 to S830, S720 to S750, and S770.

At step S810, the UE 120 can receive a set of BWP configurations from the BS 110. At step S820, the UE 120 can determine, based on its capability, whether it can monitor data transmission after the first predefined switching delay or after the second predefined switching delay corresponding to different changes between any two of the set of BWP configurations. At step S830, the UE 120 can transmit the determined switching delays correspond to the different changes to the BS 110. The method 800 can proceed to steps S720 to S750 and S770.

Figure 9:
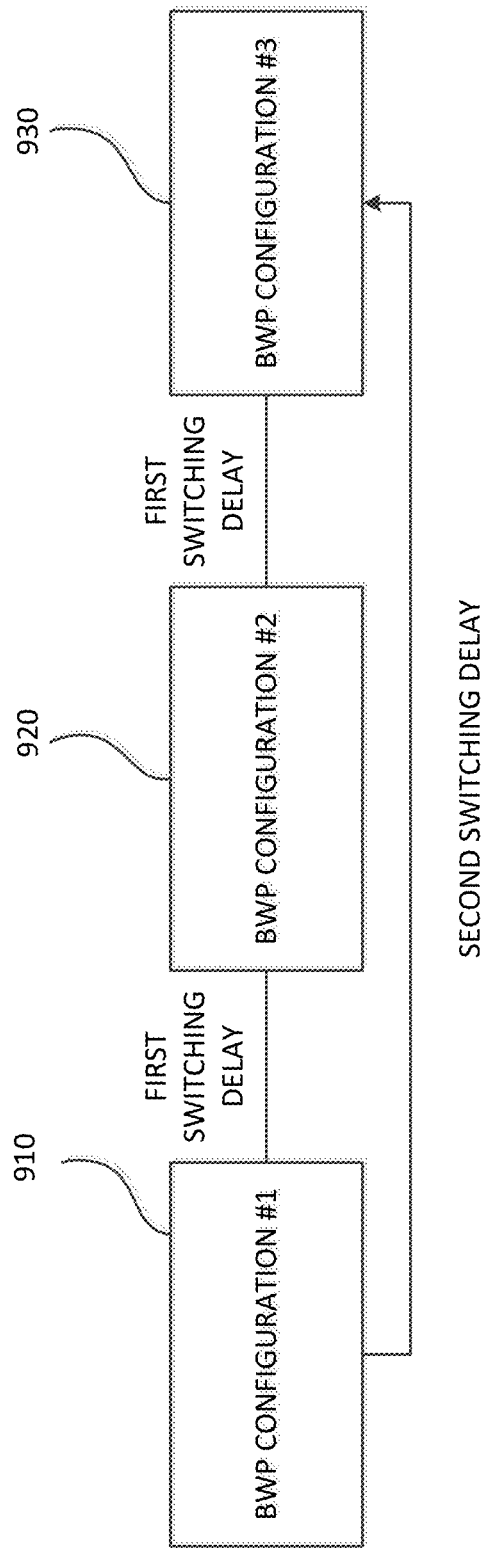
FIG. 9 shows different BWP configurations and their corresponding switching delays according to some embodiments of the disclosure.

For example, as shown in FIG. 9, the UE 120 can receive BWP configuration #1 910, BWP configuration #2 920 and BWP configuration #3 930. The UE 120, based on its capability, can determine that a change between BWP configuration #1 910 and BWP configuration #2 920 includes at least one of the predefined set of BWP configuration parameters and a switching delay is the first switching delay; determine that a change between BWP configuration #2 920 and BWP configuration #3 930 includes at least one of the predefined set of BWP configuration parameters and a switching delay is also the first switching delay; and determine that a change between BWP configuration #3 930 and BWP configuration #1 910 does not include any one of the predefined set of BWP configuration parameters and a switching delay is the second switching delay. Accordingly, the UE 120 can transmit to the BS 110 the first switching delay corresponding to the change between BWP configuration #1 910 and BWP configuration #2 920, the first switching delay corresponding to the change between BWP configuration #2 920 and BWP configuration #3 930, and the second delay corresponding to the change between BWP configuration #3 930 and BWP configuration #1 910. Therefore, the BS 110 can know when it can transmit data transmission to the UE after transmitting the signaling, and the UE 120 can know when it shall start to monitor any possible data transmission from the BS 110 after receiving the signaling.

Figure 10:
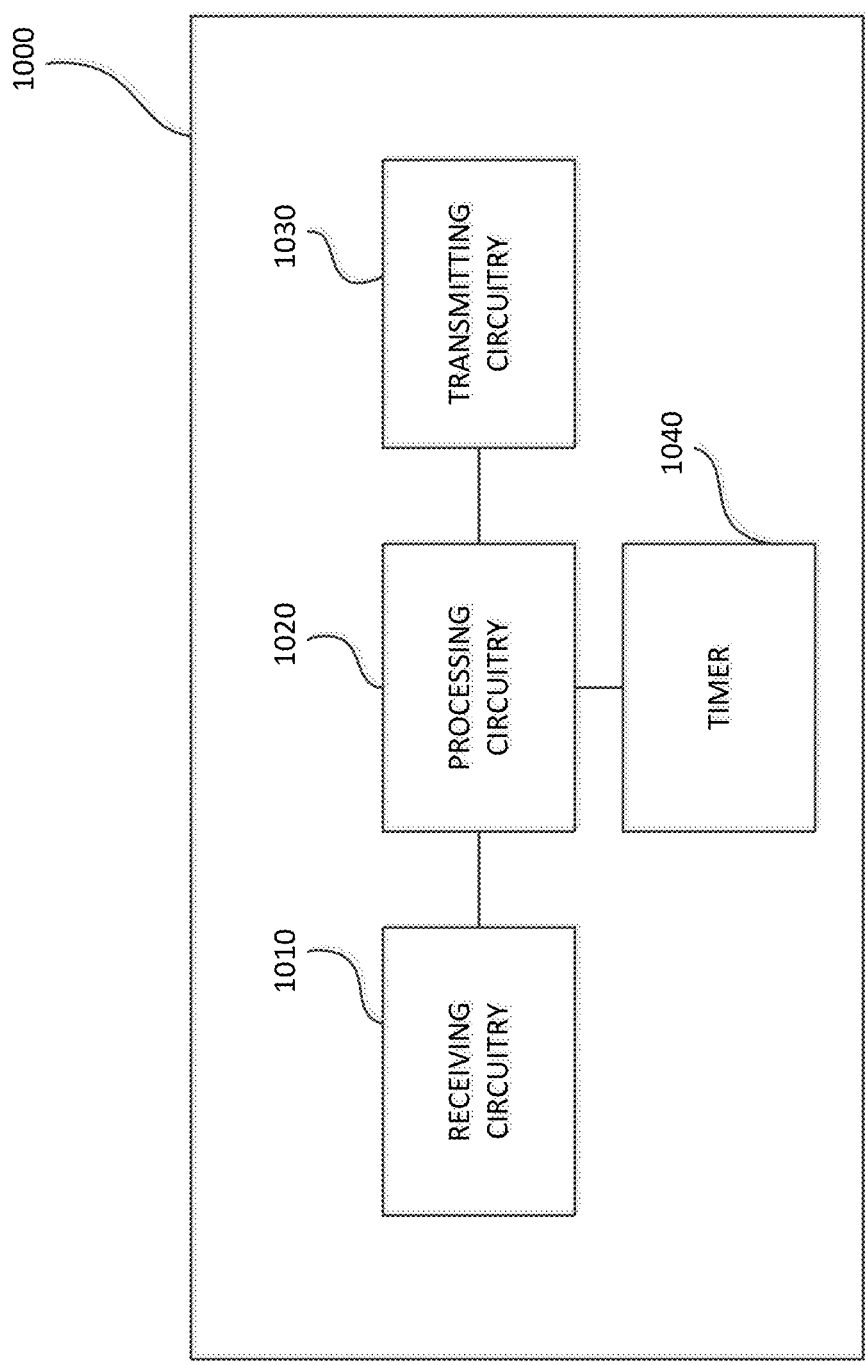
FIG. 10 is a functional block diagram of an exemplary apparatus for performing a BWP switching process within different BWP switching delays according to some embodiments of the disclosure.

FIG. 10 is a functional block diagram of an exemplary apparatus 1000 for performing a BWP switching process within different BWP switching delays according to some embodiments of the disclosure. The apparatus 1000 can be configured to perform various functions in accordance with one or more embodiments or examples described herein. Thus, the apparatus 1000 can provide means for implementation of techniques, processes, functions, components, systems described herein. For example, the apparatus 1000 can be used to implement functions of the UE 120 in various embodiments and examples described herein. The apparatus 1000 can be a general purpose computer in some embodiments, and can be a device including specially designed circuits to implement various functions, components, or processes described herein in other embodiments. The apparatus 1000 can include receiving circuitry 1010, processing circuitry 1020, transmitting circuitry 1030 and a timer 1040.

In an embodiment, the receiving circuitry 1010 can be configured for receiving from the BS 110 a signaling indicating a change to a BWP configuration of the UE 120. For example, the signaling can be a DCI. For another example, the signaling can trigger the timer 1040. In another embodiment, the receiving circuitry 1010 can be further configured for receiving a predefined set of BWP configuration parameters from the BS 110. In yet another embodiment, the processing circuitry 1020 can be configured for performing a BWP configuration switching process based on the change to the BWP configuration to switch an active BWP configuration to a new BWP configuration, and for monitoring data transmission from the BS with the new BWP configuration either after a first predefined switching delay when the change to the BWP configuration includes at least one of the predefined set of BWP configuration parameters or after a second predefined switching delay when the change to the BWP configuration does not include any one of the predefined set of BWP configuration parameters. In some embodiments, the transmitting circuitry 1030 can be configured for transmitting to the BS 110 an indication as to whether the UE can monitor data transmission after the second predefined switching delay when the change to the BWP configuration does not include any one of the predefined set of BWP configuration parameters.

In some embodiments, the receiving circuitry 1010 can be further configured for receiving a set of BWP configurations from the BS 110. In some other embodiments, the processing circuitry 1020 can be further configured for determining whether it can monitor data transmission after the first predefined switching delay or after the second predefined switching delay corresponding to different changes between any two of the set of BWP configurations. In various embodiments, the transmitting circuitry 1030 can be configured for transmitting the determined switching delays corresponding to the different changes to the BS 110.

In various embodiments according to the disclosure, the receiving circuitry 1010, the processing circuitry 1020 and the transmitting circuitry 1030 can include circuitry configured to perform the functions and processes described herein in combination with software or without software. In various examples, the processing circuitry 1020 can be a digital signal processor (DSP), an application specific integrated circuit (ASIC), programmable logic devices (PLDs), field programmable gate arrays (FPGAs), digitally enhanced circuits, or comparable device or a combination thereof. In some other embodiments according to the disclosure, the processing circuitry 1020 can be a central processing unit (CPU) configured to execute program instructions to perform various functions and processes described herein.

The apparatus 1000 can optionally include other components, such as input and output devices, additional or signal processing circuitry, and the like. Accordingly, the apparatus 1000 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for performing a bandwidth part (BWP) process within different switching delays, comprising:
   receiving at a user equipment (UE) from a base station (BS) a signaling indicating a change to a BWP configuration of the UE;
   performing a BWP configuration switching process based on the change to the BWP configuration to switch an active BWP configuration to a new BWP configuration; and
   monitoring data transmission from the BS with the new BWP configuration either after a first predefined switching delay when the change to the BWP configuration includes at least one of a predefined set of BWP configuration parameters or after a second predefined switching delay when the change to the BWP configuration does not include any one of the predefined set of BWP configuration parameters,
   wherein the predefined set of BWP configuration parameters includes a central frequency, cyclic prefix and subcarrier spacing (SCS), and the signaling is a downlink control information (DCI).

2. The method of claim 1, further comprising:
   receiving the predefined set of BWP configuration parameters from the BS.

3. The method of claim 1, further comprising:
   receiving a set of BWP configurations;
   determining whether the UE monitors data transmission after the first predefined switching delay or after the second predefined switching delay corresponding to different changes between any two of the set of BWP configurations; and
   transmitting the determined switching delays corresponding to the different changes between any two of the set of BWP configurations to the BS.

4. The method of claim 1, further comprising transmitting to the BS an indication as to whether the UE monitors data transmission after the second predefined switching delay when the change to the BWP configuration does not include any one of the predefined set of BWP configuration parameters.

5. The method of claim 1, wherein the signaling triggers a timer of the UE.

6. The method of claim 1, wherein the second predefined switching delay is shorter than a radio resource control (RRC)-based BWP switching delay.

7. The method of claim 1, wherein the second predefined switching delay is not longer than the first predefined switching delay.

8. The method of claim 1, wherein the BWP configuration switching process is a maximum layer switching process, and starting to monitoring data transmission from the BS with the new BWP configuration includes starting to monitoring data transmission from the BS with the new BWP configuration after the second predefined switching delay.

9. The method of claim 1, wherein the BWP configuration switching process is a cross-slot scheduling process, and starting to monitoring data transmission from the BS with the new BWP configuration includes starting to monitoring data transmission from the BS with the new BWP configuration after the second predefined switching delay.

10. The method of claim 1, wherein the BWP configuration switching process is a dormant-non-dormant cell switching process, and starting to monitoring data transmission from the BS with the new BWP configuration includes starting to monitoring data transmission from the BS with the new BWP configuration after the second predefined switching delay.

11. An apparatus for performing a bandwidth part (BWP) process within different switching delays, comprising:
    receiving circuitry configured for receiving from a base station (BS) a signaling indicating a change to a BWP configuration of a user equipment (UE); and
    processing circuitry configured for performing a BWP configuration switching process based on the change to the BWP configuration to switch an active BWP configuration to a new BWP configuration, and for monitoring data transmission from the BS with the new BWP configuration either after a first predefined switching delay when the change to the BWP configuration includes at least one of a predefined set of BWP configuration parameters or after a second predefined switching delay when the change to the BWP configuration does not include any one of the predefined set of BWP configuration parameters, wherein the predefined set of BWP configuration parameters includes a central frequency, cyclic prefix and subcarrier spacing (SCS), and the signaling is a downlink control information (DCI).

12. The apparatus of claim 11, wherein the receiving circuitry is further configured for receiving the predefined set of BWP configuration parameters from the BS.

13. The apparatus of claim 11, further comprising transmitting circuitry, wherein the receiving circuitry is further configured for receiving a set of BWP configurations, the processing circuitry is further configured for determining whether the UE monitors data transmission after the first predefined switching delay or after the second predefined switching delays corresponding to different changes between any two of the set of BWP configurations, and the transmitting circuitry is configured for transmitting the determined switching delays corresponding to the different changes to the BS.

14. The apparatus of claim 11, further comprising transmitting circuitry configured for transmitting to the BS an indication as to whether the UE monitors data transmission after the second predefined switching delay when the change to the BWP configuration does not include any one of the predefined set of BWP configuration parameters.

15. The apparatus of claim 11, further comprising:
a timer configured for being triggered by the signaling.

16. The apparatus of claim 11, wherein the second predefined switching delay is shorter than an radio resource control (RRC)-based BWP switching delay.

17. The apparatus of claim 11, wherein the second predefined switching delay is not longer than the first predefined switching delay.

18. The apparatus of claim 11, wherein the BWP configuration switching process is a maximum Multiple Input Multiple Output (MIMO) layer switching process, and the processing circuitry is configured for starting to monitoring data transmission from the BS with the new BWP configuration after the second predefined switching delay.

19. The apparatus of claim 11, wherein the BWP configuration switching process is a cross-slot scheduling process, and the processing circuitry is configured for starting to monitoring data transmission from the BS with the new BWP configuration after the second predefined switching delay.

20. The apparatus of claim 11, wherein the BWP configuration switching process is a dormant-non-dormant cell switching process, and the processing circuitry is configured for starting to monitoring data transmission from the BS with the new BWP configuration after the second predefined switching delay.

* * * * *